United States Patent
Park et al.

(10) Patent No.: US 11,378,995 B2
(45) Date of Patent: Jul. 5, 2022

(54) AMBIENT LIGHT DEVICE FOR DIAL TYPE SHIFTING APPARATUS

(71) Applicants: Hyundai Motor Company, Seoul (KR); Kia Motors Corporation, Seoul (KR); SL Corporation, Daegu (KR)

(72) Inventors: Han Gil Park, Suwon-si (KR); Ki Young Song, Suwon-si (KR); Sung Hoon Lee, Daegu (KR); Min Gwon Lee, Gyeongsan-si (KR); Joo Young Kim, Daegu (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 122 days.

(21) Appl. No.: 16/857,404

(22) Filed: Apr. 24, 2020

(65) Prior Publication Data
US 2021/0149431 A1 May 20, 2021

(30) Foreign Application Priority Data
Nov. 14, 2019 (KR) .................. 10-2019-0145671

(51) Int. Cl.
| | |
|---|---|
| *G05G 1/10* | (2006.01) |
| *F21V 19/00* | (2006.01) |
| *F21V 7/00* | (2006.01) |
| *F21V 8/00* | (2006.01) |
| *F21V 7/04* | (2006.01) |
| *B60Q 3/20* | (2017.01) |
| *B60Q 3/62* | (2017.01) |
| *B60Q 3/80* | (2017.01) |
| *F16H 59/08* | (2006.01) |
| *F21W 111/00* | (2006.01) |
| *F21Y 115/10* | (2016.01) |

(52) U.S. Cl.
CPC ............... *G05G 1/105* (2013.01); *B60Q 3/20* (2017.02); *B60Q 3/62* (2017.02); *B60Q 3/80* (2017.02); *F16H 59/08* (2013.01); *F21V 7/0016* (2013.01); *F21V 7/04* (2013.01); *F21V 19/001* (2013.01); *G02B 6/0001* (2013.01); *F16H 2059/081* (2013.01); *F21W 2111/00* (2013.01); *F21Y 2115/10* (2016.08)

(58) Field of Classification Search
CPC .. G05G 1/105; B60Q 3/62; F21S 43/235–341
USPC ....................................................... 362/23.22
See application file for complete search history.

(56) References Cited

U.S. PATENT DOCUMENTS

| | | |
|---|---|---|
| 5,925,709 A | 7/1999 | Takahashi et al. |
| 7,579,559 B2 | 8/2009 | Schelbert et al. |

(Continued)

FOREIGN PATENT DOCUMENTS

KR   20190050374 A   5/2019

*Primary Examiner* — Sean P Gramling
(74) *Attorney, Agent, or Firm* — Slater Matsil, LLP

(57) ABSTRACT

An ambient light device for a dial type shifting apparatus is provided. The ambient light device includes a printed circuit board (PCB) coupled to a main housing, a light source fixed to the PCB, a light guide coupled to the main housing and configured to deliver light of the light source, and a light emitting mechanism provided in a shift dial coupled rotatably with respect to the main housing and configured to reflect the light of the light source delivered through the light guide to emit it outside of the shift dial in an ambient light form.

18 Claims, 10 Drawing Sheets

(56) References Cited

U.S. PATENT DOCUMENTS

| | | |
|---|---|---|
| 8,536,472 B2 | 9/2013 | Wu et al. |
| 8,884,933 B2 | 11/2014 | Yokoyama et al. |
| 2006/0096845 A1 | 5/2006 | Zegula |
| 2006/0227528 A1 | 10/2006 | Nakamoto et al. |
| 2007/0272524 A1 | 11/2007 | Girke et al. |
| 2012/0055763 A1 | 3/2012 | Chou |
| 2013/0163226 A1* | 6/2013 | Chen ................. G05G 1/105 362/85 |
| 2014/0090499 A1 | 4/2014 | Fernandez |
| 2014/0130632 A1 | 5/2014 | Karlsson et al. |
| 2017/0175883 A1 | 6/2017 | Watanabe |
| 2018/0259062 A1 | 9/2018 | Wang et al. |
| 2018/0372216 A1 | 12/2018 | Yamanaka et al. |
| 2019/0323600 A1 | 10/2019 | Jiran |
| 2020/0166122 A1 | 5/2020 | Yamamoto et al. |
| 2020/0191259 A1 | 6/2020 | Bagley et al. |
| 2020/0278023 A1 | 9/2020 | Yamamoto et al. |

* cited by examiner

AMBIENT LIGHT DEVICE FOR DIAL TYPE SHIFTING APPARATUS

CROSS-REFERENCE TO RELATED APPLICATIONS

This application claims priority to Korean Patent Application No. 10-2019-0145671, filed on Nov. 14, 2019, which application is hereby incorporated herein by reference.

TECHNICAL FIELD

The present disclosure relates to an ambient light device for a dial type shifting apparatus.

BACKGROUND

In general, a vehicle equipped with an automatic transmission controls the hydraulic pressure within a shift range set according to the running speed of the vehicle so that a shift gear of a target shift stage range may be automatically operated.

The automatic transmission generates a gear ratio by using a hydraulic circuit, a planetary gear, and friction elements to perform the shift, and control of these components is handled by a Transmission Control Unit (TCU).

A Shift By Wire (hereinafter referred to as SBW) system, which is an electronic transmission system for a vehicle, is an electronic transmission system having no mechanical connection structure such as a cable between a transmission and a shifting apparatus (a lever, a button, a dial) unlike a conventional mechanical transmission system, and is a system in which if a signal generated at the operation of the electronic shifting apparatus (the shift lever, the button or the dial) is delivered to the Transmission Control Unit (TCU), a transmission actuator (a shift cable motor, a select cable motor) is operated by an electronic signal instructed by the TCU, and the hydraulic pressure is applied or blocked to the hydraulic circuit for each shift stage by an operation of the transmission actuator, thereby electronically performing a shift control.

Therefore, the SBW-based automatic transmission may deliver the driver's shift will to the TCU as an electric signal through a simple operation of the electronic shifting apparatus (the shift lever, the button or the dial), thereby proceeding the shifting to a drive (D) stage, a reverse (R) stage, a Null stage (a Nd stage, a Nr stage), or the like more easily, and also enable the miniaturization of the shifting apparatus, thereby securing a wide space between a driver seat and a passenger seat.

A method of performing the shifting in the electronic transmission system is largely classified into a lever type using a lever, a button type using a button, and a dial type using a dial.

The dial type shifting apparatus is a configuration of generating a shift signal as the shift dial corresponding to the rotating component rotates with respect to the housing corresponding to the fixed component, and has the disadvantage in that it is difficult to implement ambient light in a dial type shifting apparatus having a shift dial operated to be rotated.

Ambient light is a decorative mood lamp that emits a soft light instead of the direct light of a light source at the necessary portion of a vehicle interior at night, and if the light from the light source comes directly into the driver's eyes, the fatigue of the driver's eyes is increased when driving at night, which reduces concentration and interferes with safe driving, such that in order to prevent this, the ambient light is implemented at the necessary portion of the vehicle interior instead of the direct light of the light source.

If the ambient light is implemented in the shifting apparatus operated by the driver, the driver may visually secure the shifting when the driver performs the shifting at night, but it is generally difficult to implement the ambient light in the dial type shifting apparatus having the shift dial rotated by the driver's operation.

Further, even if the ambient light is implemented in the dial type shifting apparatus having the shift dial operated to be rotated, as a structure in which a component having light for covering the light of the light source mostly covers 90% or more of the light of the light source, it is not possible to properly implement the ambient light due to the excessive light loss.

The foregoing explained as the background is intended merely to aid in the understanding of the background of the present disclosure, and is not intended to mean that the present disclosure falls within the purview of the related art that is already known to those skilled in the art.

SUMMARY

The present disclosure relates to an ambient light device for a dial type shifting apparatus. Particular embodiments relate to an ambient light device for a dial type shifting apparatus capable of implementing ambient light in a shift dial rotated by a driver's operation.

An embodiment of the present disclosure provides an ambient light device for a dial type shifting apparatus that is a configuration that is configured to fix a printed circuit board (PCB), a light source, and a light guide to a main housing corresponding to a fixed component, and has a reflector and a lighting window for reflecting the light of the light source to the shift dial that is a rotating component rotated by the driver's operation, thereby implementing ambient light in a dial type shifting apparatus having a shift dial rotated by the driver's operation, and through this configuration, may implement the ambient light without the light loss of the light source as much as possible, thereby enhancing merchantability.

An ambient light device for a dial type shifting apparatus according to embodiments of the present disclosure includes a PCB coupled to a main housing, a light source fixed to the PCB, a light guide coupled to the main housing and for delivering light of the light source, and a light emitting mechanism provided in a shift dial coupled rotatably with respect to the main housing and for reflecting the light of the light source delivered through the light guide to emit it to the outside of the shift dial in an ambient light form.

It is configured so that a boss part protruded upward is formed in the main housing, the light guide is installed to be fitted into the outside of the boss part, the PCB and the light source are positioned below the light guide, and the light emitting mechanism is positioned above the light guide.

The boss part protruded upward is formed in the main housing, and the light guide includes a cylindrical part installed to be fitted into the outside of the boss part. A leg part protruded downward from the cylindrical part to face the light source is fixed to the PCB.

An optic is formed on the upper surface of the cylindrical part to scatter the light of the light source.

The shift dial includes a lower dial coupled rotatably with respect to the main housing, and an upper dial coupled with the lower dial, the upper surface of the cylindrical part of the light guide faces the lower dial, and a portion facing the upper surface of the cylindrical part in the lower dial is configured as a light transmission part through which light may pass.

The light emitting mechanism includes a reflector coupled to the upper portion of the lower dial to be positioned above the light transmission part, and a lighting window coupled with the upper dial to cover the opened upper portion of the upper dial. The light of the light source having passed through the light transmission part and then reflected from the reflector is reflected again through the surface of the lower dial and the inside surface of the upper dial and then emitted to the outside through the lighting window, thereby implementing ambient light.

A pattern layer for implementing a pattern of a specific shape by using the light reflected from the reflector is formed on the surface of the lower dial.

The lower surface of the reflector facing the light transmission part is formed of an inclined surface to reflect the light of the light source to the surface of the lower dial.

According to an ambient light device for the dial type shifting apparatus according to embodiments of the present disclosure, a light source is coupled to a main housing corresponding to a fixed component, a reflector is coupled to a shift dial that is a rotating component rotating with respect to the main housing, and the light of the light source is reflected from the reflector and then emitted to the outside of the shift dial, thereby implementing ambient light.

A light guide for delivering the light of the light source to the reflector is positioned between the light source and the reflector, and the light guide is coupled to be fixed to the main housing that is a fixed component.

An embodiment according to the present disclosure is a configuration that is configured to fix the PCB, the light source, and the light guide to the main housing corresponding to the fixed component, and has the reflector and the lighting window for reflecting the light of the light source to the shift dial that is the rotating component rotated by the driver's operation, thereby implementing the ambient light in the dial type shifting apparatus having the shift dial rotated by the driver's operation, and through this configuration, may faithfully implement the ambient light while minimizing the light loss of the light source in the dial type shifting apparatus having the shift dial rotated by the driver's operation, thereby enhancing merchantability.

Further, an embodiment of the present disclosure is a configuration in which the bearing has been installed between the boss part of the main housing and the rotator coupled with the shift dial, and may prevent the direct contact between the boss part corresponding to the fixed component and the shift dial and the rotator corresponding to the rotating components to prevent generation of the friction force through the bearing at the rotation operation of the shift dial, thereby achieving wear prevention and noise prevention due to the friction force to enhance the durability, and furthermore, eliminating the occurrence of heterogeneous feeling due to the friction, thereby enhancing the operation feeling.

Further, embodiments of the present disclosure may eliminate generation of the friction force between the boss part corresponding to the fixed component and the shift dial and the rotator corresponding to the rotating components by using the bearing to eliminate the stuck phenomenon of the shift dial rotating from the Null stage to the D stage or from the Null stage to the R stage, thereby improving the quality.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF ILLUSTRATIVE EMBODIMENTS

Figure 1:
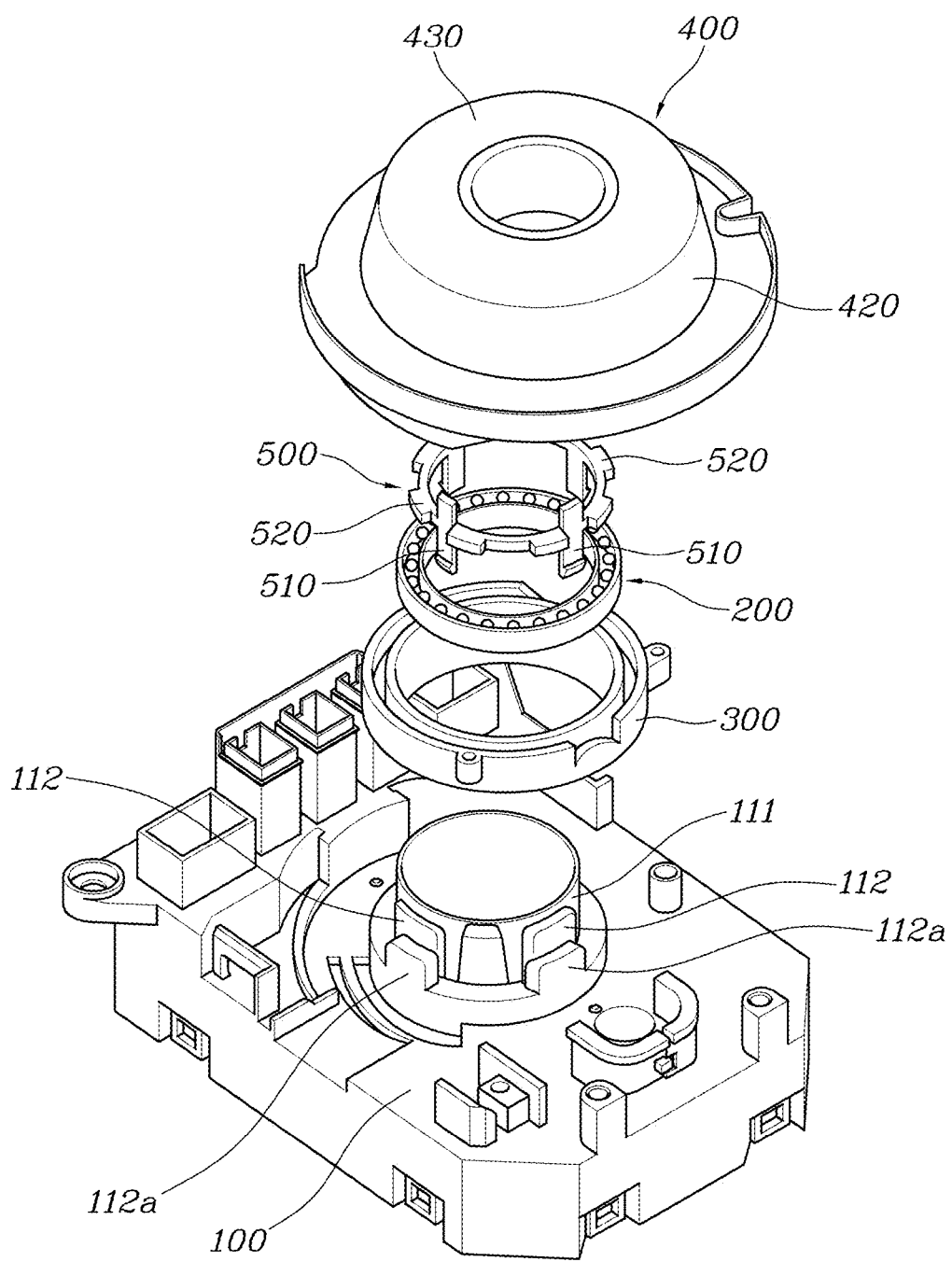
FIG. 1 is an exploded perspective diagram of a dial type shifting apparatus for an electronic transmission system according to an embodiment of the present disclosure.
Figure 2:
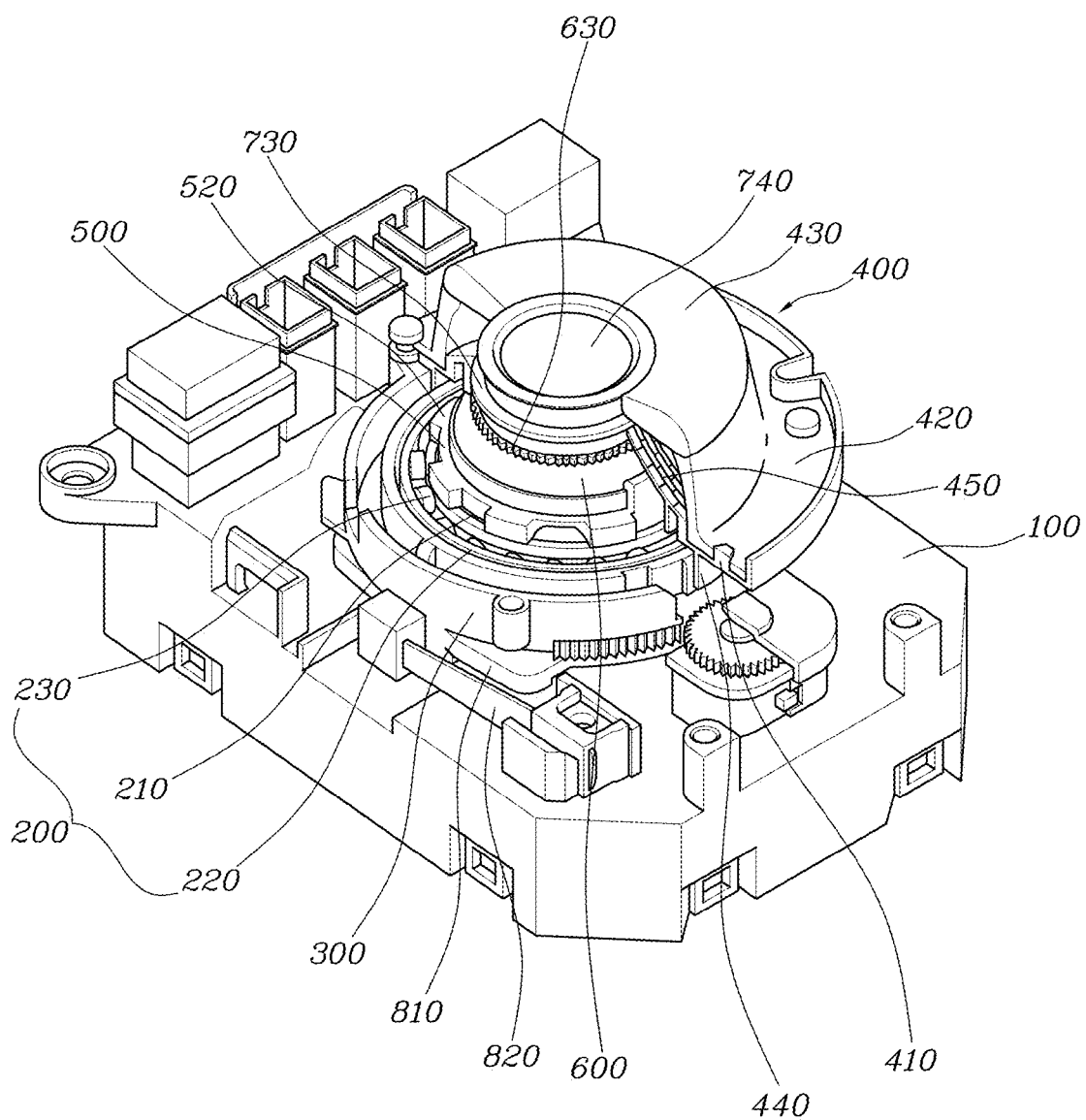
FIGS. 2 and 3 are a coupling perspective diagram and a coupled state cross-sectional diagram of FIG. 1, respectively.
Figure 3:
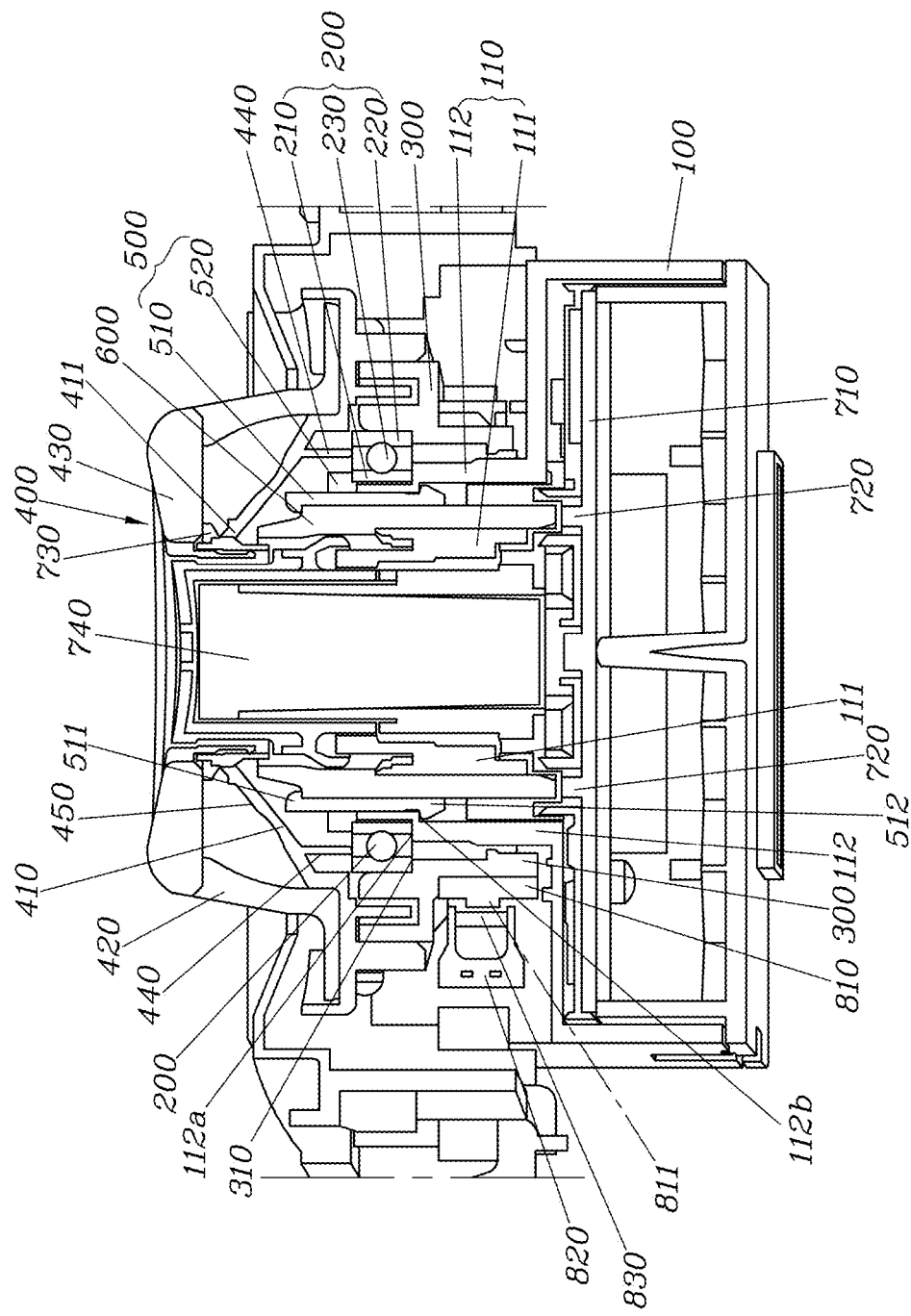
Figure 4:
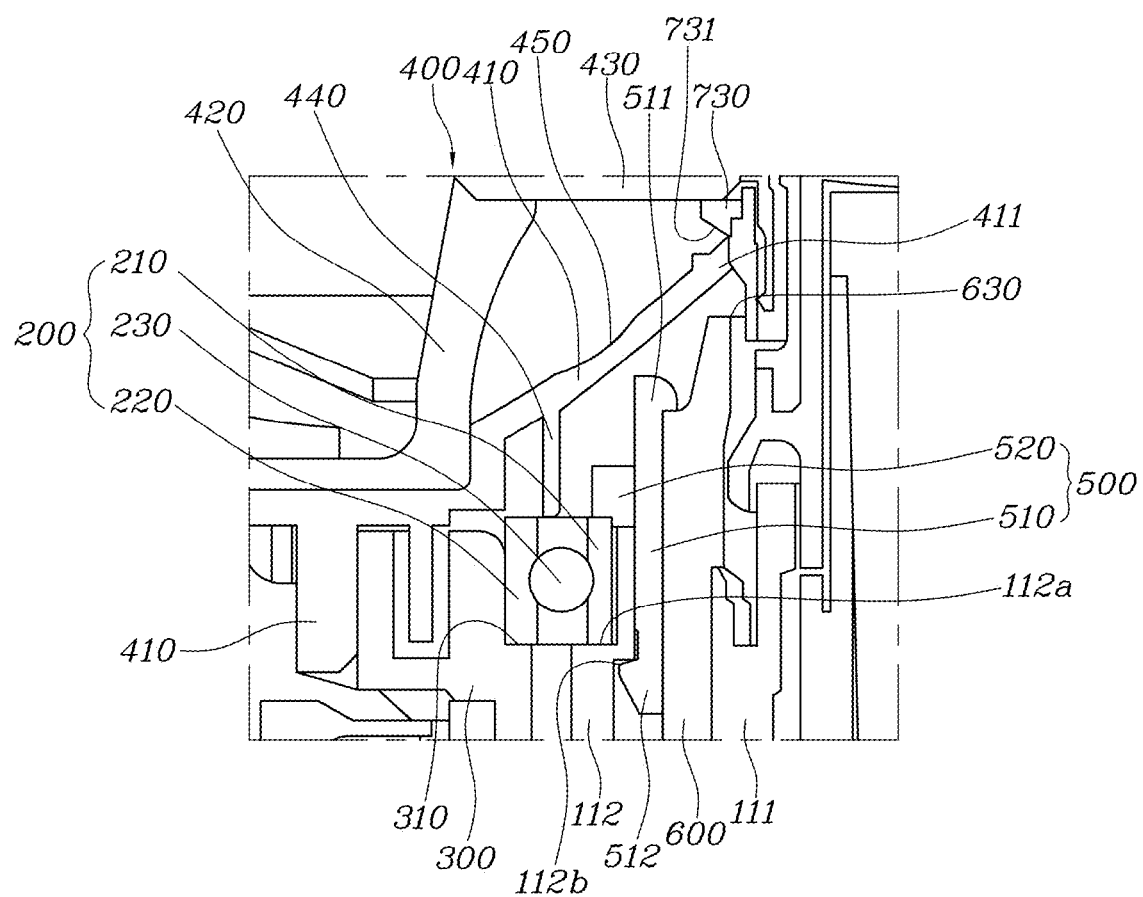
FIG. 4 is an enlarged diagram of a portion on which a bearing has been installed in FIG. 3.
Figure 5:
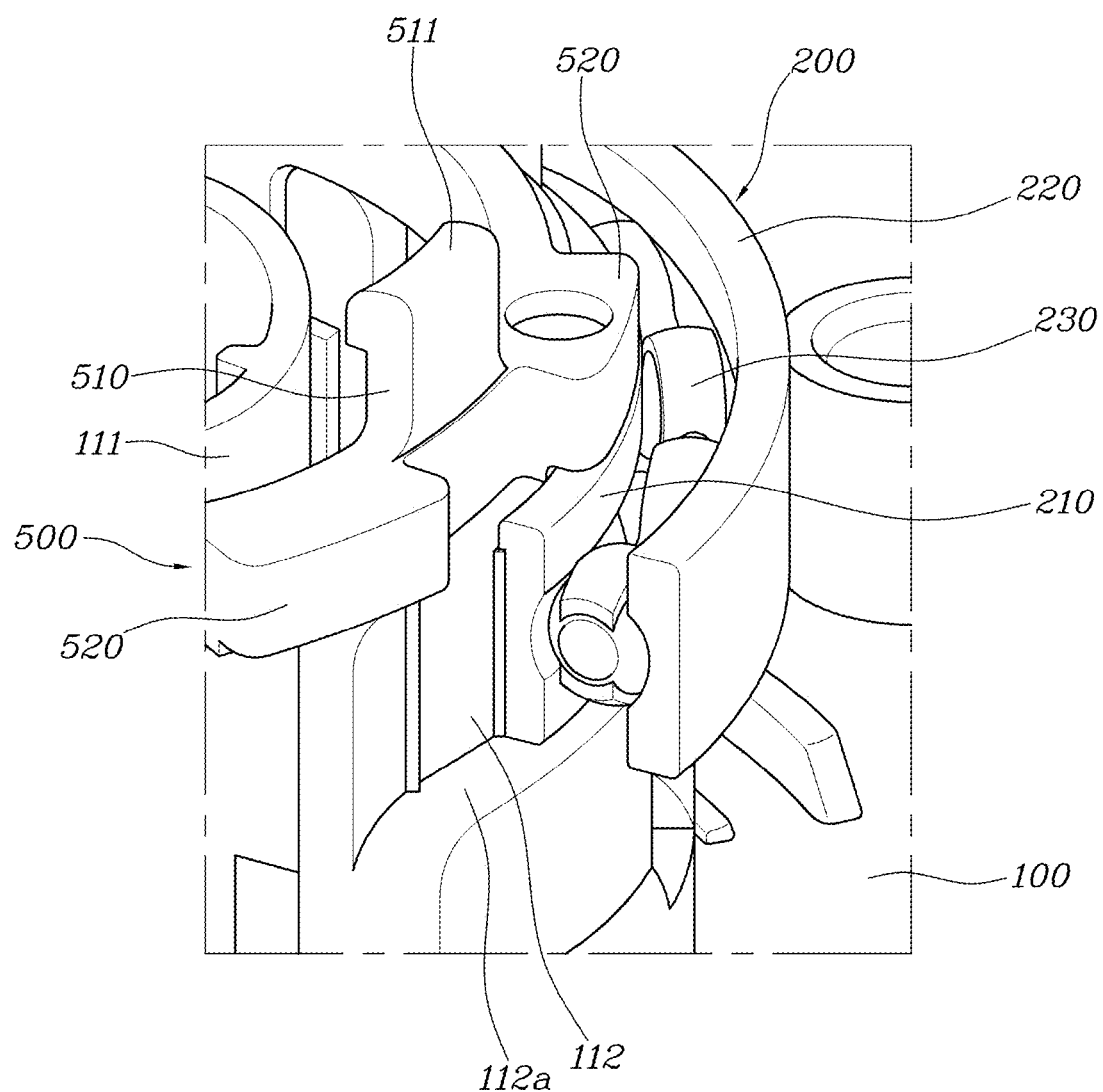
FIG. 5 is an enlarged diagram of a portion on which a bearing holder has been installed according to an embodiment of the present disclosure.
Figure 6:
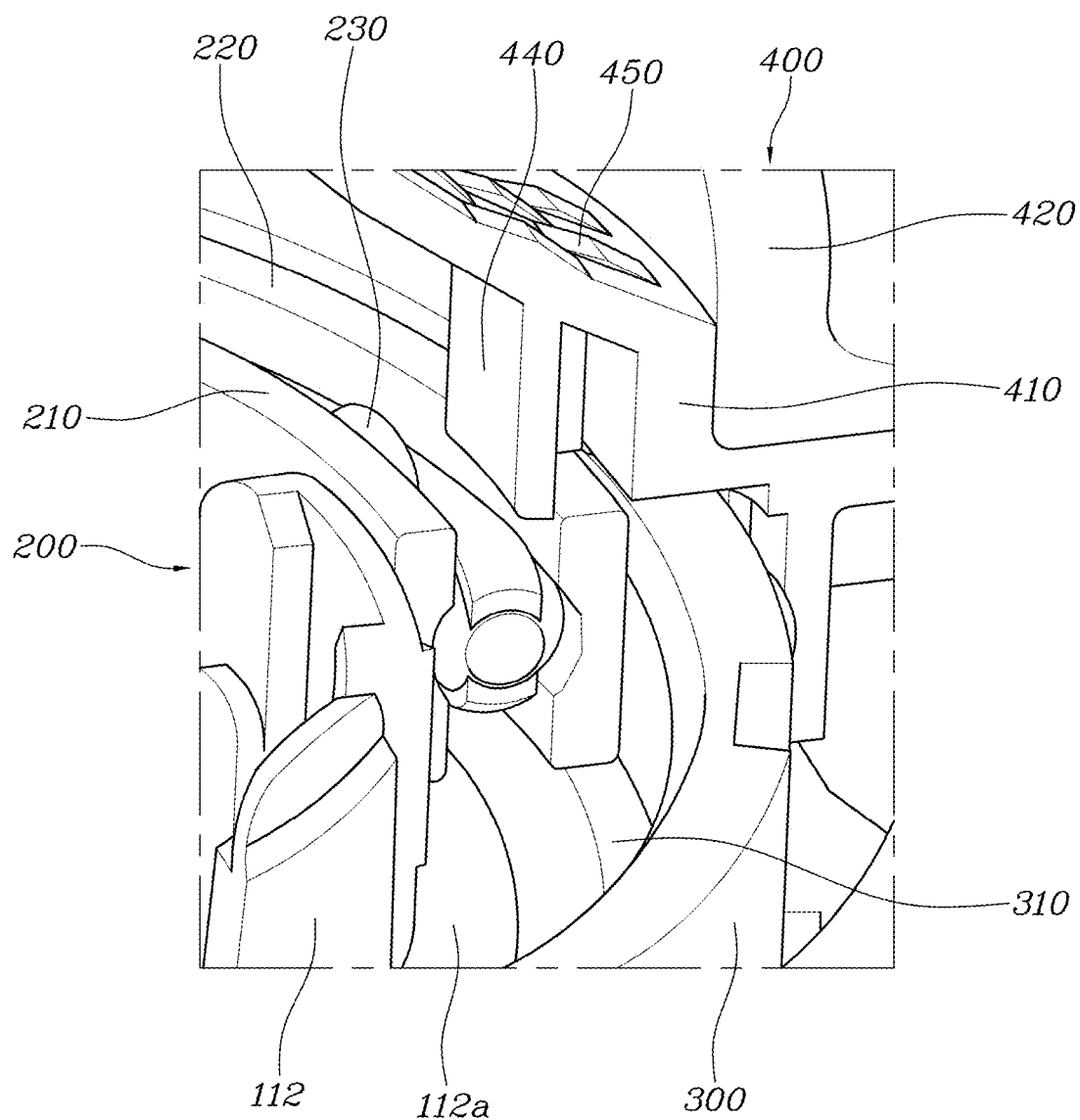
FIG. 6 is an enlarged diagram of a portion on which a dial flange has been formed according to an embodiment of the present disclosure.

Hereinafter, an ambient light device for a dial type shifting apparatus according to a preferred embodiment of the present disclosure will be described with reference to the accompanying drawings.

A dial type shifting apparatus for an electronic transmission system according to an embodiment of the present disclosure includes a main housing 100 having a boss part 110 protruded upward as illustrated in FIGS. 1 to 10.

The main housing 100 is installed to be fixed to a vehicle body (a console, a center fascia, or the like) of the side portion of a driver seat, and the main housing 100 is formed integrally with the boss part 110 formed in a cylindrical shape and protruded upward.

The boss part 110 includes a primary boss 111 of a cylindrical shape having a predetermined diameter, and a secondary boss 112 formed in a cylindrical shape having a larger diameter than that of the primary boss 111 and positioned outside the primary boss 111.

A bearing 200 is installed to be fitted into the outside of the boss part 110, a rotator 300 is installed to be fitted into the outside of the bearing 200, and the rotator 300 is coupled with a shift dial 400 rotated by a driver's hand's operation.

The bearing 200 includes an inner ring 210 forcibly press-fitted into the outside of the secondary boss 112 to be coupled integrally with the secondary boss 112, an outer ring 220 forcibly press-fitted into the inside of the rotator 300 to be coupled integrally with the rotator 300, and a plurality of balls 230 positioned between the inner ring 210 and the outer ring 220.

The rotator 300 is coupled to the lower portion of the shift dial 400 to extend downward from the shift dial 400 to be formed integrally with the shift dial 400, the rotator 300 and the bearing 200 become a structure that is covered by the shift dial 400 not to be exposed outward, and the shift dial 400 and the rotator 300 are rotated together at the driver's operation.

The bearing 200 is installed to be inserted into a gap between the secondary boss 112 and the rotator 300, and is installed so that the bearing 200 is fitted into the outside of the secondary boss 112, and the rotator 300 is fitted into the outside of the bearing 200.

That is, the inner ring 210 of the bearing 200 is coupled by being fitted into the outside of the secondary boss 112 in a forcibly press-fitting method, and the rotator 300 coupled with the shift dial 400 is coupled by being fitted into the outside of the outer ring 220 of the bearing 200 in the forcibly press-fitting method.

At this time, bearing support projections 112a, 310 in which the lower end of the bearing 200 has been seated are formed at the outside of the secondary boss 112 and the inside of the rotator 300, respectively, and the bearing support projections 112a, 310 serve to support the lower end of the bearing 200 to restrain the downward movement of the bearing 200.

The bearing support projection 112a formed at the secondary boss 112 supports the lower end of the inner ring 210 of the bearing 200, and the bearing support projection 310 formed at the rotator 300 supports the lower end of the outer ring 220 of the bearing 200.

Therefore, if the driver rotates the shift dial 400, the rotator 300 rotates together with the shift dial 400, and the outer ring 220 of the bearing 200 rotates together with the rotator 300, and at this time, the secondary boss 112 of the main housing 100 and the inner ring 210 of the bearing 200 coupled with the secondary boss 112 become fixed components that do not rotate.

As described above, an embodiment according to the present disclosure is a configuration in which the bearing 200 has been installed between the boss part 110 of the main housing 100 and the rotator 300 coupled with the shift dial 400, and may prevent the direct contact between the boss part no corresponding to the fixed component and the shift dial 400 and the rotator 300 corresponding to the rotating components to prevent generation of the friction force through the bearing 200 at the rotation operation of the shift dial 400, thereby achieving wear prevention and noise prevention due to the friction force to enhance the durability, and furthermore, may eliminate the occurrence of the heterogeneous feeling due to the friction, thereby enhancing the operation feeling.

Further, embodiments of the present disclosure may eliminate generation of the friction force between the boss part 110 corresponding to the fixed component and the shift dial 400 and the rotator 300 corresponding to the rotating components by using the bearing 200 to eliminate the stuck phenomenon of the shift dial 400 rotating from the Null stage to the D stage or from the Null stage to the R stage, thereby improving the quality.

An embodiment according to the present disclosure further has a configuration of restraining the upward movement of the bearing 200 by using a bearing holder 500, thereby preventing the upward separation of the bearing 200.

The bearing holder 500 is positioned in the shift dial 400 and fitted into a gap between the primary boss in and the secondary boss 112 to be installed to contact the upper surface of the bearing 200.

Describing it in more detail, a light guide 600 is installed to be fitted into the outside of the primary boss 111 to be coupled with the primary boss 111, a cylindrical holder coupling part 510 constituting the bearing holder 500 is fitted into a gap between the light guide 600 and the secondary boss 112, and the upper and lower ends of the holder coupling part 510 are formed in the cross section of a triangular protrusion, respectively, such that an upper triangular protrusion cross section 511 is coupled to the upper side of the light guide 600 in a latching structure, and a lower triangular protrusion cross section 512 is coupled to a latching projection 112b formed inside the secondary boss 112 in a latching structure.

A bearing pressing part 520 constituting the bearing holder 500 is formed to be protruded outward from the holder coupling part 510, and presses the upper surface of the inner ring 210 of the bearing 200 when the holder coupling part 510 is installed to be inserted into the gap between the light guide 600 and the secondary boss 112, such that the bearing 200 is pressed by the bearing holder 500, thereby preventing the upward movement and separation.

The shift dial 400 largely includes a lower dial 410 coupled with the rotator 300 and rotating with respect to the main housing 100, and an upper dial 420 coupled with the lower dial 410 and operated by a driver.

Although a lighting window 430 may be included in the shift dial 400, the lighting window 430 is described as a component of a light emitting mechanism for implementing ambient light in another embodiment of the present disclosure.

Describing the inside surface of the shift dial 400 in more detail in an embodiment according to the present disclosure, the lower inside surface of the lower dial 410 is formed integrally with a dial flange 440 protruded toward the bearing 200 installed between the secondary boss 112 and the rotator 300.

The lower end of the dial flange 440 is configured to be slightly spaced apart from the upper side of the bearing 200, and if the bearing 200 is moved upward by an external force, the upper surface of the bearing 200 contacts the lower end of the dial flange 440, and therefore, the dial flange 440 serves to prevent the upward separation of the bearing 200 together with the bearing holder 500.

The dial type shifting apparatus according to embodiments of the present disclosure further includes a device for implementing ambient light.

That is, an ambient light device for the dial type shifting apparatus according to the present disclosure further includes a Printed Circuit Board (PCB) 710 coupled to be fixed to the main housing 100, a plurality of light sources 720 fixed to the PCB 710, the light guide 600 coupled to the main housing 100 and for delivering the light of the light source 720, and a light emitting mechanism provided in the shift dial 400 coupled rotatably with respect to the main housing 100 and for reflecting the light of the light source 720 delivered through the light guide 600 to emit it to the outside of the shift dial 400 in an ambient light form.

D stage, R stage, and Null stage signals generated by the rotation operation of the shift dial 400 and a P stage signal generated by the pressing operation of a P stage button 740 are delivered to the Transmission Control Unit (TCU) through the PCB 710, a transmission actuator is operated by a signal commanded from the Transmission Control Unit, and hydraulic pressure is applied or blocked to a hydraulic circuit for each shift stage of the transmission by an operation of the transmission actuator, thereby electronically performing a shift control.

The light source 720 installed to the PCB 710 is an LED light source, and may implement the ambient light (the mood light) when the light source 720 is turned on according to the driver's switch operation.

Describing a configuration for implementing the ambient light in more detail, it is configured so that the light guide 600 is installed to be fitted into the outside of the primary boss 111 formed in the main housing 100 to be coupled with the primary boss 111, the PCB 710 and the light source 720 are positioned below the light guide 600, and the light emitting mechanism is positioned above the light guide 600.

The light guide 600 is a component for delivering the light generated from the light source 720 toward a reflector 730 to be described later, and includes a cylindrical part 610 installed to be fitted into the outside of the primary boss 111, and a plurality of leg parts 620 protruded downward from the cylindrical part 610 to face the light source 720 fixed to the PCB 710.

The leg part 620 is configured to be formed in the same number as the light source 720 so that the leg part 620 and the light source 720 are matched one by one, respectively.

Further, an optic 630 for scattering light to spread the light of the light source 720 evenly is formed on the entire upper surface of the cylindrical part 610 constituting the light guide 600.

It is possible to implement the scattered reflection of the light by the optic 630.

As the light guide 600 is positioned below the lower dial 410 constituting the shift dial 400, the optic 630 formed on the upper surface of the cylindrical part 610 of the light guide 600 is configured to face the lower dial 410, such that a portion facing the optic 630 formed on the upper surface of the cylindrical part 610 in the lower dial 410 is configured as a light transmission part 411 through which light may pass.

The light transmission part 411 of the lower dial 410 may be an air layer, or may also be formed of a transparent window through which light may pass.

The light emitting mechanism includes the reflector 730 installed to be fitted into the upper side of the lower dial 410 to be positioned above the light transmission part 411, and the lighting window 430 coupled with the upper dial 420 to cover the opened upper portion of the upper dial 420.

The lighting window 430 may be formed of a transparent window or a translucent window through which light may pass.

If the LED light source 720 is turned on through a control of the PCB 710 by the driver's switch operation, the light generated from the light source 720 moves through the light guide 600 and then passes through the light transmission part 411 of the lower dial 410, the light having passed through the light transmission part 411 of the lower dial 410 is reflected through the reflector 730 coupled to the upper side of the lower dial 410, and the light of the light source 720 reflected from the reflector 730 is reflected again through the surface of the lower dial 410 and the inside surface of the upper dial 420 and then is emitted to the outside of the shift dial 400 through the lighting window 430, thereby implementing the ambient light.

Therefore, an embodiment according to the present disclosure is a configuration that may sufficiently implement the ambient light while minimizing the light loss of the light source 720 in the dial type shifting apparatus having the shift dial 400 rotated by the driver's operation, and through this configuration, may enhance the merchantability.

That is, an embodiment of the present disclosure is a configuration in which the PCB 710, the light source 720, and the light guide 600 are configured to be fixed to the main housing 100 corresponding to the fixed component, and has the reflector 730 and the lighting window 430 for reflecting the light of the light source 720 to the shift dial 400 that is the rotating component rotated by the driver's operation, thereby implementing the ambient light and through this configuration, may faithfully implement the ambient light while minimizing the light loss of the light source 720 in the dial type shifting apparatus having the shift dial 400 rotated by the driver's operation.

According to an embodiment of the present disclosure, since a pattern layer 450 that may implement a pattern of a specific shape by using the light reflected from the reflector 730 is formed on the surface of the lower dial 410, the light of the light source 720 reflected from the reflector 730 may be irradiated to the pattern layer 450 formed on the surface of the lower dial 410, and the light irradiated to the pattern layer 450 may be exposed to the outside through the lighting window 430 constituting the shift dial 400, thereby implementing the ambient light.

Figure 10:
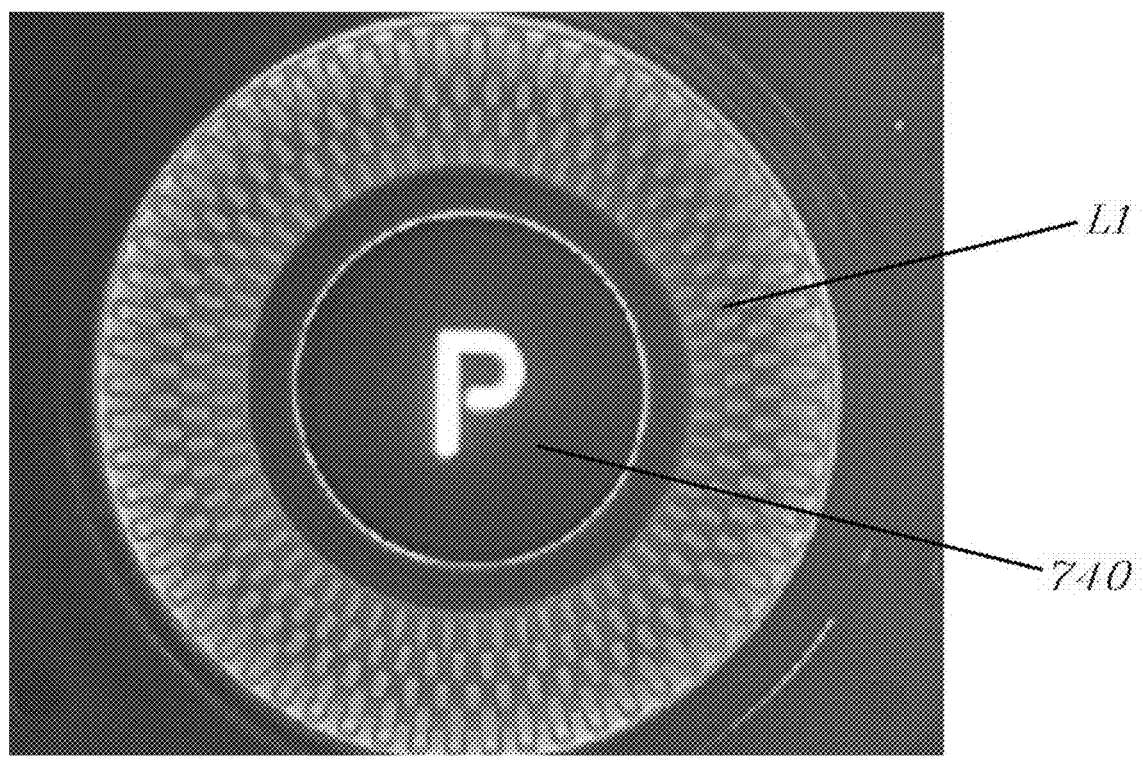
FIG. 10 is a plane diagram of a dial type shifting apparatus in which ambient light has been illuminated according to an embodiment of the present disclosure.

For example, it is possible to implement the ambient light (L1) giving the feeling that the light spreads radially through the pattern layer 450 as in FIG. 10, and to implement the ambient light of various patterns according to the shape of the pattern layer 450.

Further, according to an embodiment of the present disclosure, the lower surface of the reflector 730 facing the light transmission part 411 in the reflector 730 is preferably formed of the surface of the lower dial 410, that is, an inclined surface 731 in order to evenly reflect the light of the light source 720 to the pattern layer 450, such that the angle of the inclined surface 731 is formed at the inclination angle of the shape in which the angle between the pattern layers 450 gradually increases radially toward the outside.

Further, the dial type shifting apparatus according to embodiments of the present disclosure further includes a configuration for providing the operation feeling (the shift feeling) when the driver operates the rotation of the shift dial 400, and returning the shift dial 400 to the return position when releasing the operating force from the rotated shift dial 400.

That is, an operation feeling generation part 810 is formed integrally in the rotator 300, and a groove 811 recessed in an arc shape is formed in the longitudinal middle part of the operation feeling generation part 810.

The operation feeling generation part 810 is formed to expand in the radial direction of the rotator 300 and to have both ends extending along the circumferential direction.

Further, one end of a leaf spring assembly 820 is coupled to be fixed to the main housing 100, a roller 830 is rotatably coupled to the other end of the leaf spring assembly 820, and the roller 830 is inserted into the groove 811 or out of the groove 811 at the rotation of the shift dial 400 to contact the side surface of the operation feeling generation part 810.

Figure 7:
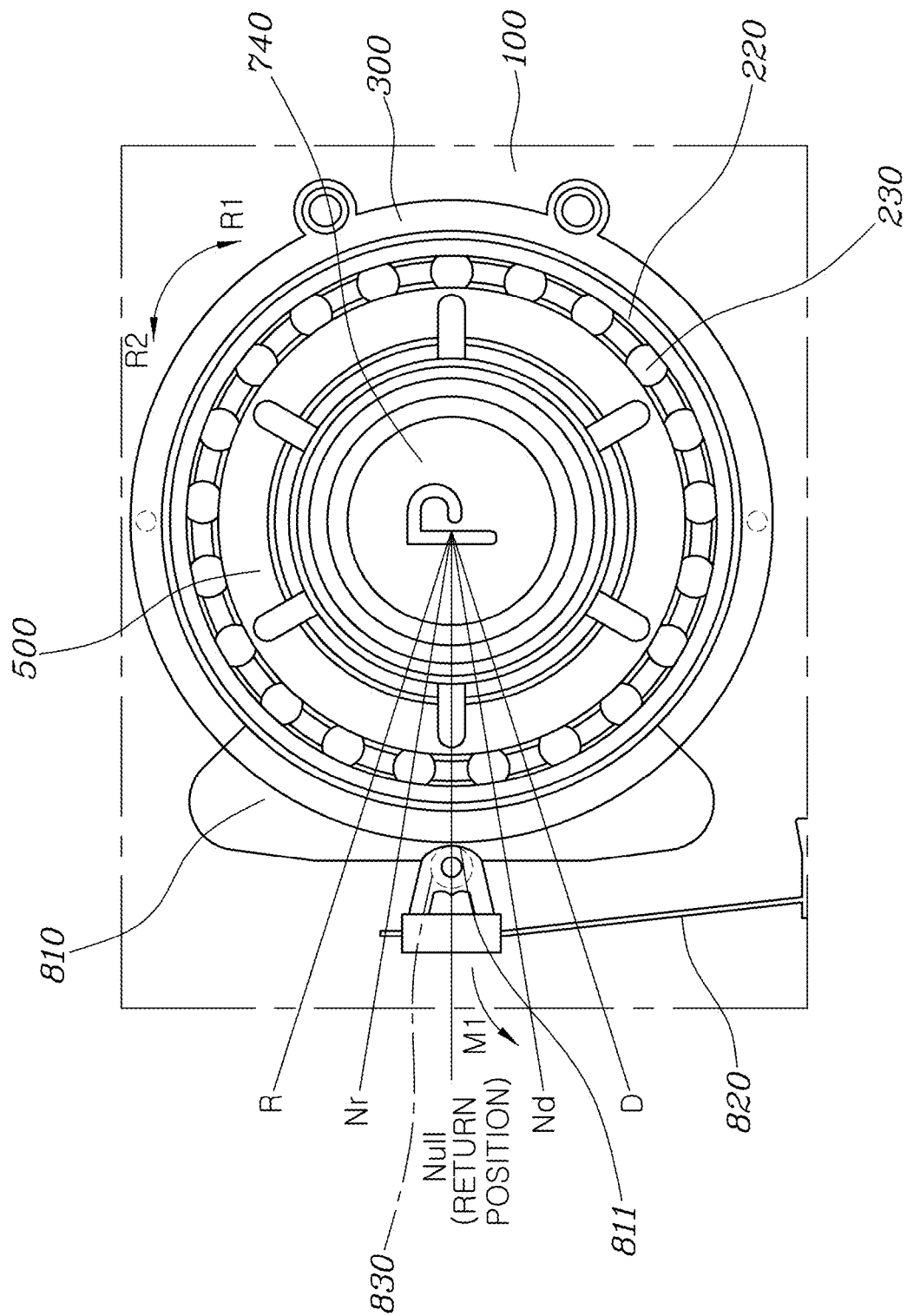
FIG. 7 is a diagram for explaining a configuration of providing an operation feeling and a return force of a shift dial according to an embodiment of the present disclosure.
Figure 8:
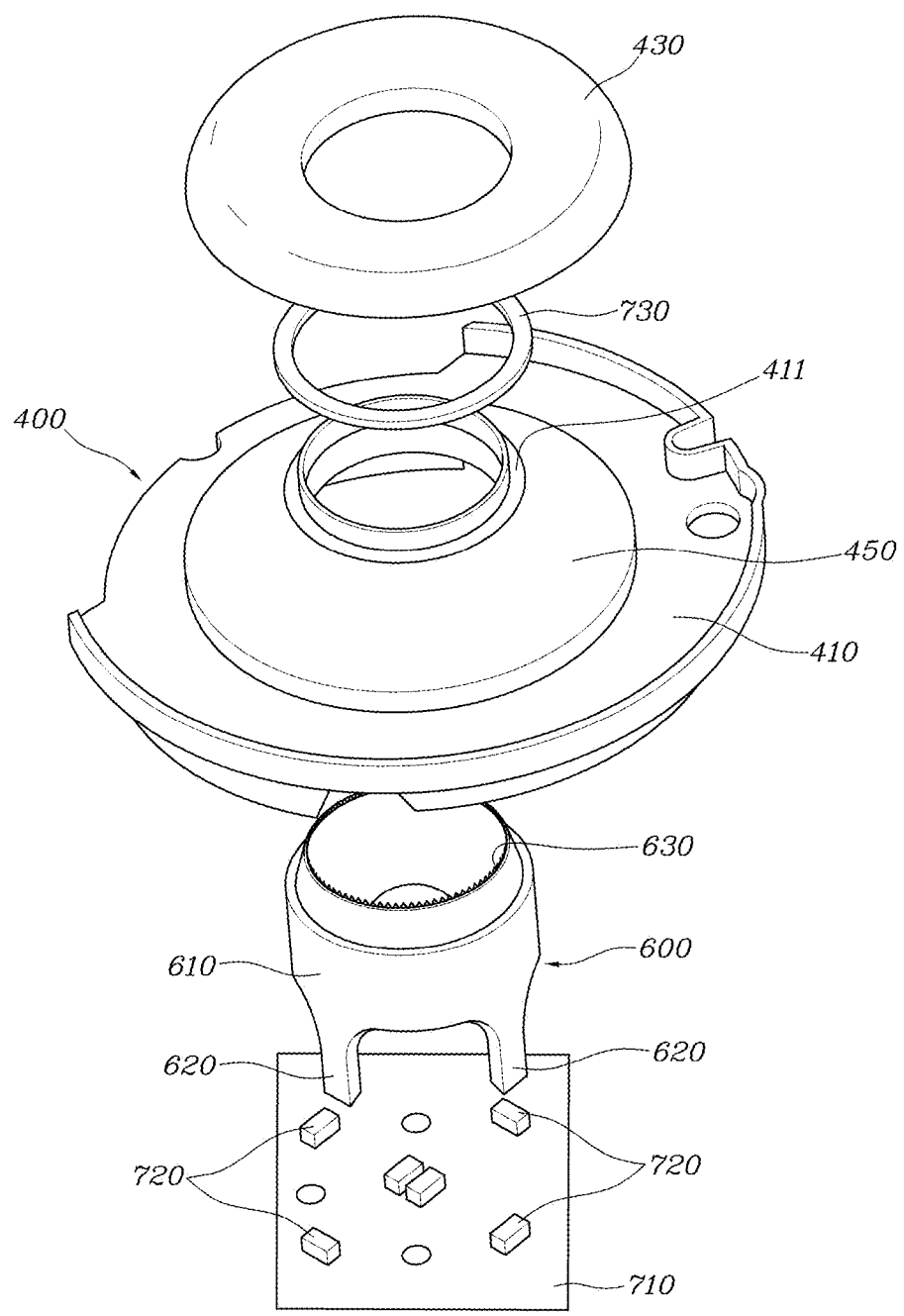
FIG. 8 is an exploded perspective diagram of an ambient light device according to an embodiment of the present disclosure.
Figure 9:
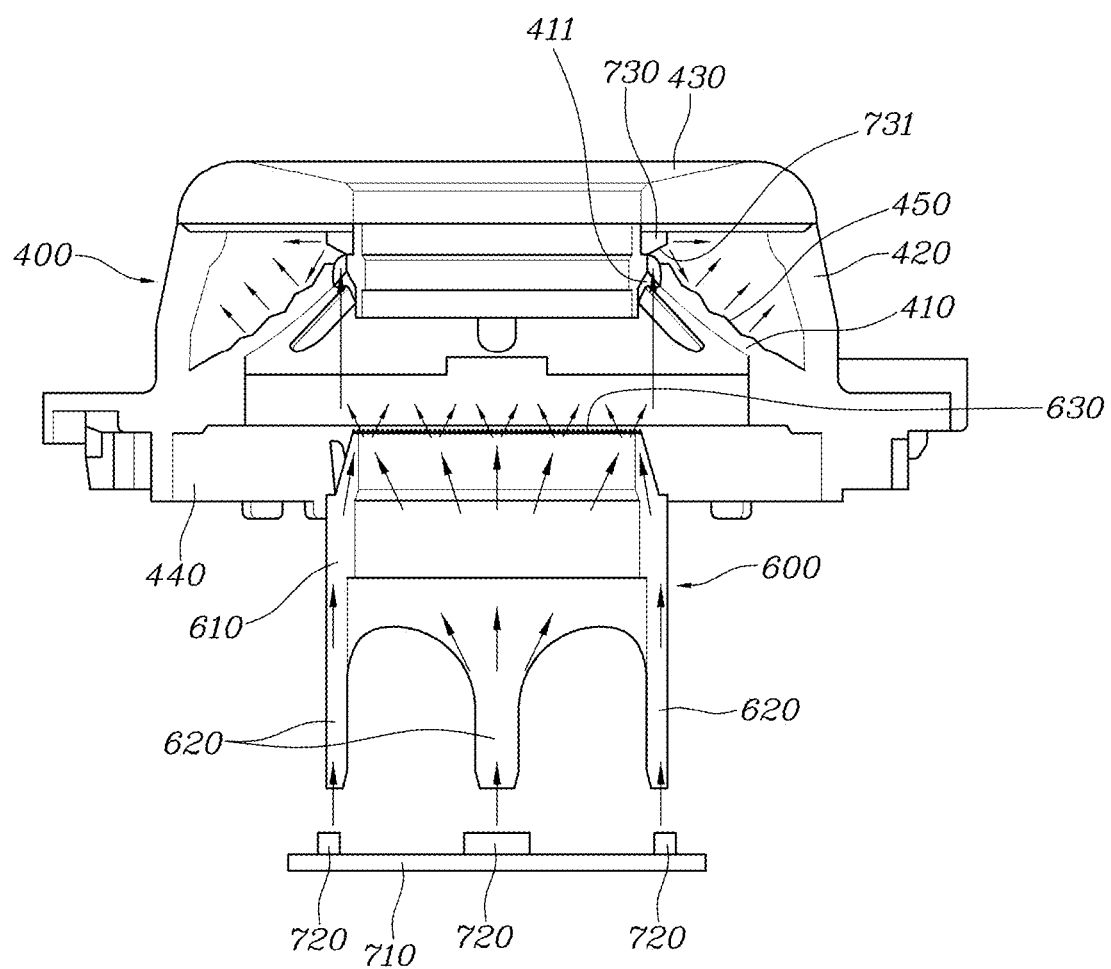
FIG. 9 is a coupled state cross-sectional diagram of FIG. 8.

As illustrated in FIG. 7, when the roller 830 is positioned in the groove 811 of the operation feeling generation part 810, the shift stage of the vehicle maintains the Null stage state.

If the driver rotates the shift dial 400 clockwise (an arrow R1) in a state where the shift stage is in the Null stage, the roller 830 in the groove 811 of the operation feeling generation part 810 is out of the groove 811 by the rotation of the rotator 300 to contact the surface of the operation feeling generation part 810, and at this time, the leaf spring assembly 820 accumulates the elastic force while being bent to the outside (an arrow M1), and the shift stage is changed into the Nd stage or the D stage.

Further, if the driver releases the operating force from the shift dial 400 rotated to the Nd stage or the D stage, the leaf spring assembly 820 bent to the outside (an arrow M1) exerts a force of moving in the opposite direction to the arrow M1 by the restoring force, the roller 830, which has been out of the groove 811 by the restoring force of the leaf spring assembly 820 to contact the surface of the operation feeling generation part 810, performs an operation that is inserted into the groove 811 again, and through this operation of the roller 830, the shift dial 400 positioned at the Nd stage or the D stage is rotated counterclockwise (an arrow R2) through the restoring force of the leaf spring assembly 820 to return to the Null stage that is the return position.

Further, since the rotation from the Null stage to the Nr stage or the R stage, and the return operation from the Nr stage or the R stage to the Null stage is the same as described above, detailed description thereof will be omitted.

As described above, the dial type shifting apparatus according to embodiments of the present disclosure is a configuration in which the bearing 200 has been installed between the boss part 110 of the main housing 100 and the rotator 300 coupled with the shift dial 400, and may prevent the direct contact between the boss part 110 corresponding to the fixed component and the shift dial 400 and the rotator 300 corresponding to the rotating components to prevent generation of the friction force through the bearing 200 at the rotation operation of the shift dial 400, thereby achieving wear prevention and noise prevention due to the friction force to enhance the durability, and furthermore, eliminating the occurrence of the heterogeneous feeling due to the friction, thereby enhancing the operation feeling.

Further, the present disclosure may eliminate generation of the friction force between the boss part 110 corresponding to the fixed component and the shift dial 400 and the rotator 300 corresponding to the rotating components by using the bearing 200 to eliminate the stuck phenomenon of the shift dial 400 rotating from the Null stage to the D stage or from the Null stage to the R stage, thereby improving the quality.

Further, an embodiment of the present disclosure is a configuration that is configured to fix the PCB 710, the light source 720, and the light guide 600 to the main housing 100 corresponding to the fixed component, and has the reflector 730 and the lighting window 430 for reflecting the light of the light source 720 to the shift dial 400 that is the rotating component rotated by the driver's operation, thereby implementing the ambient light in the dial type shifting apparatus having the shift dial 400 rotated by the driver's operation, and through this configuration, may faithfully implement the ambient light while minimizing the light loss of the light source 720 in the dial type shifting apparatus having the shift dial 400 rotated by the driver's operation, thereby enhancing the merchantability.

While the present disclosure has illustrated and described specific embodiments, it will be apparent to those skilled in the art that the present disclosure may be variously improved and modified without departing from the spirit of the present disclosure provided by the following claims.

What is claimed is:

1. An ambient light device for a dial type shifting apparatus, comprising:
   a printed circuit board (PCB) coupled to a main housing;
   a light source fixed to the PCB;
   a light guide coupled to the main housing and configured to deliver light of the light source; and
   a light emitting mechanism coupled rotatably with respect to the main housing and configured to reflect the light of the light source delivered through the light guide to emit it outside of a shift dial disposed above the light guide in an ambient light form, wherein the shift dial is coupled rotatably with respect to the main housing and the light emitting mechanism is provided in the shift dial.

2. The ambient light device for the dial type shifting apparatus according to claim 1, further comprising a boss part protruded upward in the main housing, wherein:
   the light guide is installed to be fitted into an outside of the boss part;
   the PCB and the light source are positioned below the light guide; and
   the light emitting mechanism is positioned above the light guide.

3. The ambient light device for the dial type shifting apparatus according to claim 1, further comprising a boss part protruded upward in the main housing, wherein:
   the light guide comprises a cylindrical part installed to be fitted into an outside of the boss part; and
   a leg part protruded downward from the cylindrical part to face the light source is fixed to the PCB.

4. The ambient light device for the dial type shifting apparatus according to claim 3, further comprising an optic formed on an upper surface of the cylindrical part, wherein the optic is configured to scatter the light of the light source.

5. The ambient light device for the dial type shifting apparatus according to claim 3, wherein:
   the shift dial comprises a lower dial coupled rotatably with respect to the main housing, and an upper dial coupled with the lower dial;
   an upper surface of the cylindrical part of the light guide faces the lower dial; and
   a portion of the lower dial facing the upper surface of the cylindrical part is configured as a light transmission part through which the light may pass.

6. The ambient light device for the dial type shifting apparatus according to claim 5, wherein:
   the light emitting mechanism comprises a reflector coupled to an upper portion of the lower dial to be positioned above the light transmission part;
   a lighting window is coupled with the upper dial to cover an opened upper portion of the upper dial; and
   the ambient light device is configured so that the light of the light source having passed through the light transmission part and been reflected from the reflector is reflected again through a surface of the lower dial and an inside surface of the upper dial and then emitted to the outside through the lighting window.

7. The ambient light device for the dial type shifting apparatus according to claim 6, further comprising a pattern layer, configured to implement a pattern of a specific shape by using the light reflected from the reflector, formed on the surface of the lower dial.

8. The ambient light device for the dial type shifting apparatus according to claim 6, wherein a lower surface of the reflector facing the light transmission part comprises an inclined surface and is configured to reflect the light of the light source to the surface of the lower dial.

9. An ambient light device for a dial type shifting apparatus, comprising:
   a light source coupled to a main housing corresponding to a fixed component, wherein a reflector is coupled to a rotating component rotating with respect to the main housing so that the reflector is rotatable relative to the main housing;
   wherein the ambient light device is configured such that a light of the light source is reflected from the reflector and then emitted to an outside of the rotating component disposed above the light source; and
   wherein the rotating component is a shift dial that is coupled rotatably with respect to the main housing, the reflector being provided in the shift dial.

10. The ambient light device for the dial type shifting apparatus according to claim 9, further comprising a light guide configured to deliver the light of the light source to the reflector positioned between the light source and the reflector, wherein the light guide is coupled to be fixed to the main housing.

11. A vehicle comprising:
a vehicle body;
a main housing fixed to the vehicle body; and
an ambient light device for a dial type shifting apparatus, comprising:
  a printed circuit board (PCB) coupled to the main housing;
  a light source fixed to the PCB;
  a light guide coupled to the main housing and configured to deliver light of the light source; and
  a light emitting mechanism coupled rotatably with respect to the main housing and configured to reflect the light of the light source delivered through the light guide to emit it outside of a shift dial disposed above the light guide in an ambient light form, wherein the shift dial is coupled rotatably with respect to the main housing and the light emitting mechanism is provided in the shift dial.

12. The vehicle according to claim 11, further comprising a boss part protruded upward in the main housing, wherein:
the light guide is installed to be fitted into an outside of the boss part;
the PCB and the light source are positioned below the light guide; and
the light emitting mechanism is positioned above the light guide.

13. The vehicle according to claim 11, further comprising a boss part protruded upward in the main housing, wherein:
the light guide comprises a cylindrical part installed to be fitted into an outside of the boss part; and
a leg part protruded downward from the cylindrical part to face the light source is fixed to the PCB.

14. The vehicle according to claim 13, further comprising an optic formed on an upper surface of the cylindrical part, wherein the optic is configured to scatter the light of the light source.

15. The vehicle according to claim 13, wherein:
the shift dial comprises a lower dial coupled rotatably with respect to the main housing, and an upper dial coupled with the lower dial;
an upper surface of the cylindrical part of the light guide faces the lower dial; and
a portion of the lower dial facing the upper surface of the cylindrical part is configured as a light transmission part through which the light may pass.

16. The vehicle according to claim 15, wherein:
the light emitting mechanism comprises a reflector coupled to an upper portion of the lower dial to be positioned above the light transmission part;
a lighting window is coupled with the upper dial to cover an opened upper portion of the upper dial; and
the ambient light device is configured so that the light of the light source having passed through the light transmission part and been reflected from the reflector is reflected again through a surface of the lower dial and an inside surface of the upper dial and then emitted to the outside through the lighting window.

17. The vehicle according to claim 16, further comprising a pattern layer, configured to implement a pattern of a specific shape by using the light reflected from the reflector, formed on the surface of the lower dial.

18. The vehicle according to claim 16, wherein a lower surface of the reflector facing the light transmission part comprises an inclined surface and is configured to reflect the light of the light source to the surface of the lower dial.

* * * * *